(12) United States Patent
Chandorkar

(10) Patent No.: US 10,489,874 B2
(45) Date of Patent: Nov. 26, 2019

(54) COMPUTER IMPLEMENTED SYSTEM AND METHOD FOR STEGANOGRAPHY

(71) Applicant: Zensar Technologies Ltd., Pune (IN)

(72) Inventor: Paritosh Hemchandra Chandorkar, Pune (IN)

(73) Assignee: ZENSAR TECHNOLOGIES LTD., Pune (IN)

(*) Notice: Subject to any disclaimer, the term of this patent is extended or adjusted under 35 U.S.C. 154(b) by 23 days.

(21) Appl. No.: 15/822,726

(22) Filed: Nov. 27, 2017

(65) Prior Publication Data
US 2018/0158167 A1 Jun. 7, 2018

(30) Foreign Application Priority Data
Dec. 13, 2016 (IN) .............................. 201621042538

(51) Int. Cl.
*G06T 1/00* (2006.01)
*G06T 1/20* (2006.01)
(52) U.S. Cl.
CPC ................ *G06T 1/005* (2013.01); *G06T 1/20* (2013.01); *G06T 2201/0051* (2013.01)
(58) Field of Classification Search
CPC ..... G06T 2201/0061; G06T 2201/0051; G06T 2201/005; G06T 1/005; G06T 1/0021; G06T 1/80; G06T 1/60; G06K 9/00; H04N 1/32144; H04N 1/32288; H04N 21/8358; H04N 19/467

USPC .......................................................... 382/100
See application file for complete search history.

(56) References Cited

U.S. PATENT DOCUMENTS

| | | | | |
|---|---|---|---|---|
| 6,430,430 | B1* | 8/2002 | Gosche ................. | G06T 7/0012 600/410 |
| 2002/0054355 | A1* | 5/2002 | Brunk ................... | G06T 1/0071 358/3.28 |
| 2005/0141747 | A1* | 6/2005 | Shi ........................ | G06T 1/0028 382/100 |
| 2011/0058188 | A1* | 3/2011 | Guo .................... | H04N 1/32224 358/1.9 |
| 2013/0182268 | A1* | 7/2013 | Ono ........................ | H04N 1/46 358/1.9 |

* cited by examiner

*Primary Examiner* — Ali Bayat
(74) *Attorney, Agent, or Firm* — Blueshift IP, LLC; Robert Plotkin

(57) ABSTRACT

A computer implemented system for steganography comprises an encoding machine for encoding secret data into a cover image to generate the steganography image, and a decoding machine for extracting the secret data from the steganography image. The encoding machine comprises a first memory, a first processor, an input module and an encoder module. The decoding machine comprises a second memory, a second processor, a receiver module, and a decoder module. The system has a comparatively lower error rate (approx. 19.5-21.5 percent) than the conventional steganography method Optimal Pixel Adjustment Procedure (OPAP).

6 Claims, 8 Drawing Sheets

| Px-1,y-1 | Px-1,y | Px-1,y+1 |
|---|---|---|
| Px,y-1 | Target | Px,y+1 |
| Px+1,y-1 | Px+1,y | Px+1,y+1 |

FIGURE 3A

| Px,y | Px,y+1 |
|---|---|
| Px+1,y | Don't Care |

FIGURE 3B

COMPUTER IMPLEMENTED SYSTEM AND METHOD FOR STEGANOGRAPHY

FIELD

The present disclosure relates to the field of steganography.

DEFINITIONS

As used in the present disclosure, the following terms are generally intended to have the meaning as set forth below, except to the extent that the context in which they are used indicate otherwise.

The expression "Cover Image" used hereinafter in this specification refers to, but is not limited to, an image in which secret data is to be embedded.

The expression "Steganography image" used hereinafter in this specification refers to, but is not limited to, an image in which secret data is embedded.

The expression "Mean Square Error (MSE)" used hereinafter in this specification refers to, but is not limited to, an estimator for measuring the average error or deviations in a steganography image with respect to a cover image. The Mean Square Error (MSE) is being calculated based on the following formula:

$$MSE = \frac{1}{M-N} \sum_{x=1}^{M} \sum_{y=1}^{N} [x(m,n) - y(m,n)]^2$$

wherein x (m, n) represents the cover image and y (m, n) represents the steganography image of size 'm*n' pixels. The 'm' represents the number of rows in the input image (cover image) and 'n' represents the number of columns in input images (cover image). The value of Mean Square Error (MSE) should be lower for better quality images.

The expression "Peak Signal to Noise Ratio (PSNR)" used hereinafter in this specification refers to, but is not limited to, test the robustness of data embedding algorithm. It is a measure for comparing restoration results (cover image to the steganography image). The Peak Signal to Noise Ratio (PSNR) is being calculated based on the following formula:

$$PSNR = 10 \log_{10}(R^2/MSE)$$

wherein 'R' is the intensity value of each pixel in the image.

The expression "Structural Similarity Index Method (SSIM)" used hereinafter in this specification refers to, but is not limited to, determine the three factors that are loss of correlation, luminance distortion and contrast distortion. The value of Structural Similarity Index Method (SSIM) is in the interval [1, 0]. If SSIM value is 1 that means the two images are exactly the same. If SSIM value is 0 that means the two images are totally unrelated.

These definitions are in addition to those expressed in the art.

BACKGROUND

Steganography is one of the techniques for data-hiding which is being worked in the research world and created quite a mark in the industry. It is a major milestone in the information security industry and has a lot of commercial applications. The crux of this technology is that the secret data is embedded in the image at a secret location (pixel). This image is then transmitted to receiver through communication channel. The secret data cannot be intercepted as the hacker does not know when (time) the data has been sent and in which pixel of the image the secret data is hidden.

The prior-art provides for various techniques such as pixel value differencing (PVD) with optimal pixel adjustment procedure (OPAP), zigzag pixel value differencing, and hamming technique. However, the techniques provided in the prior-art have drawbacks such as visible borderline pixels, loss of data during transmission, degraded image quality when secret data is embedded in the image.

Therefore, there is a need to develop a system and method for steganography which alleviates the above mentioned drawbacks.

OBJECTS

Some of the objects of the present disclosure aimed to ameliorate one or more problems of the prior art or to at least provide a useful alternative are listed herein below.

An object of the present disclosure is to provide a computer implemented system for steganography which exchange sensitive data.

Another object of the present disclosure is to provide a computer implemented system for steganography which generating better quality steganography image.

Yet another object of the present disclosure is to provide a computer implemented system for steganography which hides more secret data in the images/videos.

Other objects and advantages of the present disclosure will be more apparent from the following description when read in conjunction with the accompanying figures, which are not intended to limit the scope of the present disclosure.

SUMMARY

The present disclosure envisages a computer implemented system for steganography. The computer implemented system for steganography comprising an encoding machine and a decoding machine. The encoding machine comprises a first memory, a first processor, an input module, an encoder module and transmitter module. The first memory is configured to store a first set of predetermined rules, target pixel selection rules, and secret data embedding rules. The first processor is adapted to cooperate with the first memory to receive the first set of predetermined rules, and is further configured to generate encoding machine processing commands. The input module is configured to receive secret data having a plurality of bits and a cover image having a plurality of pixels, from a user. The encoder module is adapted to cooperate with the input module to receive the secret data and the cover image. The encoder module comprises a first target pixel selector, a first gray value calculator, a first secret data calculator, and an embedding module. The first target pixel selector is configured to select at least one target pixel from the plurality of pixels of the cover image, based on the target pixel selection rules. The first gray value calculator is configured to calculate largest gray value difference between a predefined number of pixels surrounding the target pixel. The first secret data calculator is adapted to receive the largest gray value difference and is configured to calculate the number of bits of the secret data to be embedded in the target pixel, based on the secret data embedding rules. The embedding module is configured to embed the calculated number of bits of the secret data into the target pixel to generate a steganography image. The transmitter module is adapted to cooperate with the embedding module to receive the steganography image and is configured to transmit the steganography image. The decoding machine is adapted to cooperate with the encoding machine. The encoding machine comprises a second memory, a second processor, a receiver module, and a decoder module. The second memory is configured to store a second set of predetermined rules, target pixel selection rules, and secret data extraction rules. The second processor is adapted to cooperate with the second memory to receive the second set of predetermined rules and is further configured to generate decoding machine processing commands. The receiver module is configured to receive the steganography image. The decoder module comprises a second target pixel selector, a second gray value calculator, a second secret data calculator, and an extraction module. The second target pixel selector is configured to select at least one target pixel from the plurality of pixels of the steganography image, based on the target pixel selection rules. The second gray value calculator is configured to calculate largest gray value difference between a predefined numbers of pixels surrounding the target pixel. The second secret data calculator is adapted to receive the largest gray value difference and is configured to calculate the number of bits of the secret data to be extracted from the target pixel, based on the secret data extraction rules. The extraction module is configured to extract the calculated number of bits of the secret data from the target pixel of the steganography image.

In an embodiment, predefined number of pixels surrounding the target pixel is two. In another embodiment, the predefined number of pixels surrounding the target pixel is eight.

The present disclosure also envisages a method for steganography, the method comprising:

storing, in a first memory, a first set of predetermined rules, target pixel selection rules, and secret data embedding rules;

receiving, by a first processor, the first set of predetermined rules and generating encoding machine processing commands;

receiving, by an input module, secret data having a plurality of bits and a cover image having a plurality of pixels, from a user;

selecting, by a first target pixel selector, at least one target pixel from the plurality of pixels of the cover image, based on the target pixel selection rules;

calculating, by a first gray value calculator, largest gray value difference between a predefined number of pixels surrounding the target pixel;

calculating, by a first secret data calculator, the number of bits of the secret data to be embedded in the target pixel, based on the secret data embedding rules;

embedding, by an embedding module, the calculated number of bits of the secret data into the target pixel to generate a steganography image;

receiving and transmitting said steganography image;

storing, in a second memory, a second set of predetermined rules, target pixel selection rules, and secret data extraction rules;

receiving, by a second processor, the second set of predetermined rules and generating decoding machine processing commands;

receiving, by a receiver module, the steganography image;

selecting, by a second target pixel selector, at least one target pixel from the plurality of pixels of the steganography image, based on the target pixel selection rules;

calculating, by a second gray value calculator, largest gray value difference between a predefined number of pixels surrounding the target pixel;

receiving, by a second secret data calculator, the largest gray value difference and calculating the number of bits of the secret data to be extracted from the target pixel, based on the secret data extraction rules; and extracting, by an extraction module, the calculated number of bits of the secret data from the target pixel of the steganography image.

BRIEF DESCRIPTION OF THE ACCOMPANYING DRAWING

The computer implemented steganography system of the present disclosure will now be described with the help of the accompanying drawing, in which:

FIG. 3A illustrates a target pixel surrounded by eight pixels, according to an embodiment of the present disclosure;

FIG. 3B illustrates a target pixel surrounded by two pixels, according to an embodiment of the present disclosure;

Figure 1:
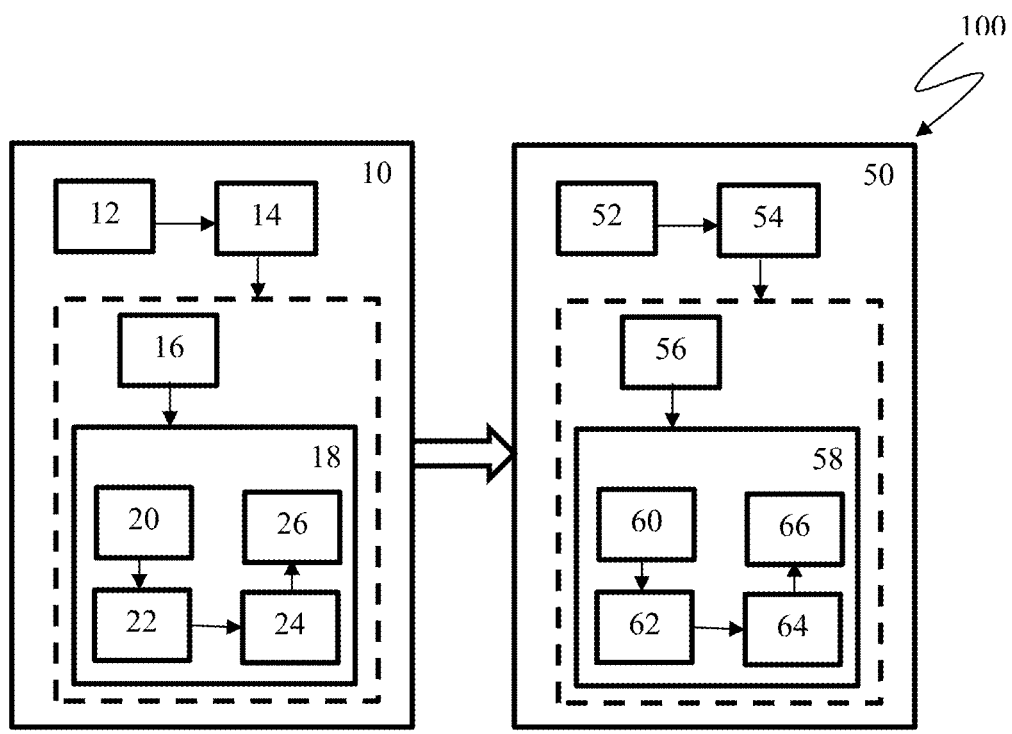
FIG. 1 illustrates a schematic block diagram of the steganography system, according to an embodiment of the present disclosure.

FIGS. 4A, 5A, 6A, and 7A illustrate steganography images containing secret data, generated using OPAP method; and FIGS. 4B, 5B, 6B, and 7B illustrate steganography images containing secret data, generated using Method 1 and Method 2, according to an embodiment of the present disclosure.

LIST OF REFERENCE NUMERALS

| Reference Numeral | Reference |
| --- | --- |
| 100 | steganography system |
| 10 | encoding machine |
| 12 | first memory |
| 14 | first processor |
| 16 | input module |
| 18 | encoder module |
| 20 | first target pixel selector |
| 22 | first gray value calculator |
| 24 | first secret data calculator |
| 26 | embedding module |
| 28 | transmitter module |
| 50 | decoding machine |
| 52 | second memory |
| 54 | second processor |
| 56 | receiver module |
| 58 | decoder module |
| 60 | second target pixel selector |
| 62 | second gray value calculator |
| 64 | second secret data calculator |
| 66 | extraction module |

DETAILED DESCRIPTION

Steganography is one of the techniques for data-hiding which is being worked in the research world and created quite a mark in the industry. It is a major milestone in the information security industry and has a lot of commercial applications. The crux of this technology is that secret data is embedded in the image at a secret location (pixel). This image is then transmitted to receiver through communication channel. The secret data cannot be intercepted as the hacker does not know when (time) the data has been sent and in which pixel of the image the secret data is hidden.

The prior-art provides for various techniques such as pixel value differencing (PVD) with optimal pixel adjustment procedure (OPAP), zigzag pixel value differencing, and hamming technique. However, the techniques provided in the prior-art have drawbacks such as visible borderline pixels, loss of data during transmission, degrading the image quality when secret data is embedded in the image.

Therefore, there is a need to develop a steganography system and method which alleviates the above mentioned drawbacks.

The present disclosure envisages a computer implemented steganography system. FIG. 1 illustrates a schematic block diagram of the steganography system, according to an embodiment of the present disclosure. The steganography system 100 comprising an encoding machine 10 and a decoding machine 50. The encoding machine 10 comprising a first memory 12, a first processor 14, an input module 16, an encoder module 18, and a transmitter module 28.

The first memory 12 is configured to store a first set of predetermined rules, target pixel selection rules, and secret data embedding rules. The first memory 12 may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes. In an embodiment, the first memory 12 also stores cover images for hiding the secret data.

The first processor 14 is adapted to cooperate with the first memory 12 to receive the first set of predetermined rules. The first processor 14 is further configured to generate encoding machine processing commands. The first processor 14 may be implemented as one or more microprocessors, microcomputers, microcontrollers, digital signal processors, central processing units, state machines, logic circuitries, and/or any devices that manipulate signals based on operational instructions. Among other capabilities, the first processor 14 is configured to fetch and execute the first set of predetermined rules stored in the first memory 12.

The input module 16 is configured to receive secret data having a plurality of bits and a cover image having a plurality of pixels, from a user as an input.

The encoder module 18 is adapted to cooperate with the input module 16 to receive the secret data and the cover image. The encoder module 18 comprises a first target pixel selector 20, a first gray value calculator 22, a first secret data calculator 24 and an embedding module 26.

The first target pixel selector 20 is configured to select at least one target pixel from the plurality of pixels of the cover image, based on the target pixel selection rules. In an embodiment, the first target pixel selector 20 selects the target pixel randomly.

The first gray value calculator 22 is configured to calculate largest gray value difference between a predefined number of pixels surrounding the target pixel.

In an embodiment, the predefined number of pixels surrounding the target pixel is two. FIG. 3b illustrates a target pixel surrounded by the two pixels $P_{x,y+1}$ and $P_{x+1,y}$.

Calculate $d = g_{max} - g_{min}$ wherein $g_{max}$ and $g_{min}$ is maximum and minimum gray value of pixels $P_{x,y+1}$ and $P_{x+1,y}$, and 'd' is the largest gray value difference between the eight pixels.

In another embodiment, the predefined number of pixels surrounding the target pixel is eight. FIG. 3a illustrates a target pixel surrounded by the eight pixels $P_{x-1,y-1}$, $P_{x-1,y}$, $Px_{-1,y}$, $P_{x-1,y+1}$, $P_{x,y-1}$, $P_{x,y+1}$, $P_{x+1,y-1}$, $P_{x+1,y}$ and $P_{x+1,y+1}$.

Calculate $d = g_{max} - g_{min}$ wherein $g_{max}$ and $g_{min}$ is maximum and minimum gray value of Pixels $P_{x-1,y-1}$, $P_{x-1,y}$, $P_{x-1,y+1}$, $P_{x,y-1}$, $P_{x,y+1}$, $P_{x-1,y-1}$, $P_{x+1,y}$ and $P_{x+1,y+1}$, and 'd' is the largest gray value difference between the eight pixels.

The first secret data calculator 24 is adapted to receive the largest gray value difference and is configured to calculate the number of bits of the secret data to be embedded in the target pixel, based on the secret data embedding rules. In an embodiment, the number of bits (n) of secret data to be embedded in the target pixel is being calculated based on the following rules:

n=1, (if 0<=d<=1)
n=$\log_2 d$ (if d>1)
If n>4, (then set the n=4)

The embedding module 26 is configured to embed the calculated number of bits (n) of the secret data into the target pixel to generate a steganography image.

The transmitter module 28 is adapted to cooperate with the embedding module 26 to receive said steganography image. Further, the transmitter module 28 is configured to transmit the steganography image.

A pseudo-code for the encoding machine 10 is given below, in accordance with an embodiment of the present disclosure:

I. Suppose, there are eight pixels ($P_{x-1,y-1}$, $P_{x-1,y}$, $P_{x-1,y+1}$, $P_{x,y-1}$, $P_{x,y+1}$, $P_{x+1,y-1}$, $P_{x+1,y}$ and $P_{x+1,y+1}$).
II. There is an edge area A of the eight pixels, in which secret data is embedded.
III. Suppose, $g_{max}$ is a maximum gray value of the eight pixels, and $g_{min}$ is a minimum gray value of the eight pixels.
IV. Determine the largest gray value difference between the eight pixels d:

```
int g_max , g_min;
float d;
printf ("Enter the maximum gray value g_max: ");
if (scanf("%d", & g_min) == 1)
    {
        d= g_max - g_min;
        printf ("the largest gray value difference d is: %d", d);
    }
else
    {
        printf (" Error, Enter correct value: ");
    }
```

V. Calculate the number of bits "n" of the secret data to be embedded in the target pixel:

```
if (0 <= d <= 1)
    then, n=1;
else
{
        if (d>1),
           then, n=log_2 d;
}
```

```
    else
    {
        if (n>4),
            then, n=4.
```

The decoding machine 50 is adapted to cooperate with the encoding machine 10. The decoding machine 50 communicates with the encoding machine 10 using wired/wireless communication network. The decoding machine 50 comprising a second memory 52, a second processor 54, a receiver module 56, and a decoder module 58.

The second memory 52 is configured to store a second set of predetermined rules, target pixel selection rules, and secret data extraction runes. The second memory 52 may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes.

The second processor 54 is adapted to cooperate with the second memory 52 to receive the second set of predetermined rules and is further generate decoding machine processing commands. The second processor 54 may be implemented as one or more microprocessors, microcomputers, microcontrollers, digital signal processors, central processing units, state machines, logic circuitries, and/or any devices that manipulate signals based on operational instructions. Among other capabilities, the second processor 54 is configured to fetch and execute the second set of predetermined rules stored in the second memory 52.

The receiver module 56 is configured to cooperate with the second processor 54 to receive the decoding machine processing commands and the steganography image.

The decoder module 58 comprises a second target pixel selector 60, a second gray value calculator 62, a second secret data calculator 64, and an extraction module 66.

The second target pixel selector 60 is configured to select at least one target pixel from the plurality of pixels of the steganography image, based on the target pixel selection rules. In an embodiment, the second target pixel selector 60 receives the position of the target pixel containing secret data from the first target pixel selector 20.

The second gray value calculator 62 is configured to calculate largest gray value difference between a predefined numbers of pixels surrounding the target pixel.

In an embodiment, the predefined number of pixels surrounding the target pixel is two. FIG. 3b illustrates a target pixel surrounded by the two pixels $P_{x,y+1}$ and $P_{x+1,y}$.

Calculate $d=g_{max}-g_{min}$ wherein $g_{max}$ and $g_{min}$ is maximum and minimum gray value of pixels $P_{x,y+1}$ and $P_{x+1,y}$, and 'd' is the largest gray value difference between the eight pixels.

In another embodiment, the predefined number of pixels surrounding the target pixel is eight. FIG. 3a illustrates a target pixel surrounded by the eight pixels $P_{x-1,y-1}$, $P_{x-1,y}$, $P_{x-1,y+1}$, $P_{x,y-1}$, $P_{x,y+1}$, $P_{x+1,y-1}$, $P_{x-1,y}$ and $P_{x-1,y+1}$.

Calculate $d=g_{max}-g_{min}$ wherein $g_{max}$ and $g_{min}$ is maximum and minimum gray value of Pixels $P_{x-1,y-1}$, $P_{x-1,y}$, $P_{x-1,y+1}$, $P_{x,y-1}$, $P_{x,y+1}$, $P_{x+1,y-1}$, $P_{x+1,y}$ and $P_{x+1,y+1}$, and 'd' is the largest gray value difference between the eight pixels.

The second secret data calculator 64 is adapted to receive the largest gray value difference and is configured to calculate the number of bits of the secret data to be extracted from the target pixel, based on the secret data extraction rules.

In an embodiment, the number of bits (n) of secret data to be extracted from the target pixel is being calculated based on the following rules:

if $0<=d^*>=1$ the $n^*=1$ if $d^*>1$ $n^*=\log_2 d^*$

If $d^*>4$, (then set the $n^*=4$)

The extraction module 66 is configured to extract the calculated number of bits 'n' of the secret data from the target pixel of the steganography image. In an embodiment, the extraction module 66 calculates the decimal representation of secret message 'b' based on the following equation:

$$b=gx^* \bmod 2n^*$$

Further, the extraction module 66 extracts '$n^*$' bits of secret data by converting the value of 'b' into a binary string.

A pseudo-code for the decoding machine 50 is given below, in accordance with an embodiment of the present disclosure:

I. Determine the largest gray value difference between the eight pixels d:

```
int g_max* , g_min* ;
float d*;
printf ("Enter the maximum gray value g_max*: ");
if (scanf ("%d", & g_min*) == 1)
    {
        d*= g_max* - g_min* ;
        printf ("the largest gray value difference d is: %d", d*);
    }
else
    {
        printf (" Error, Enter correct, value: ");
    }
```

II. Calculate the number of bits of the secret data, extracted from a target pixel Px*:

```
if (0 <= d* <= 1)
    then, n=1;
else
    {
        if (d*>1),
            then, n=log_2d*;
    }
else
    {
        if (n*>4),
            then, n*=4
    }
```

III. Calculate a value of 'b' and convert it into a binary string:

$$b=gx^* \bmod 2n^*$$

Table 1 provides the comparison of the Mean Square Error (MSE), Peak Signal to Noise Ratio (PSNR), and Structural Similarity Index Method (SSIM) for sixteen images processed by the method 1 (wherein the predefined number of pixels surrounding the target pixel is eight), the method 2 (wherein the predefined number of pixels surrounding the target pixel is two) and the optimal pixel adjustment procedure (OPAP).

TABLE 1

| Cover Image | State of secret data | Method 1 | | | Method 2 | | | OPAP | | |
|---|---|---|---|---|---|---|---|---|---|---|
| | | MSE | PSNR | SSIM | MSE | PSNR | SSIM | MSE | PSNR | SSIM |
| Image 1 | 1 KB | 0.157 | 56.172 | 0.997 | 0.326 | 52.992 | 0.995 | 0.32 | 53.07 | 0.994 |
| | 10 KB | 5.03 | 41.114 | 0.916 | 5.889 | 40.429 | 0.91 | 4.839 | 41.28 | 0.919 |
| | 100 KB | 35.589 | 32.617 | 0.407 | 35.64 | 32.611 | 0.405 | 35.73 | 32.85 | 0.438 |
| | 200 KB | 35.589 | 32.617 | 0.407 | 35.64 | 32.611 | 0.405 | 33.7 | 32.85 | 0.438 |
| Image 2 | 1 KB | 34.914 | 32.7 | 0.418 | 33.689 | 32.855 | 0.438 | 24.369 | 34.26 | 0.593 |
| | 10 KB | 34.781 | 32.717 | 0.42 | 35.143 | 32.672 | 0.414 | 34.85 | 32.7 | 0.419 |
| | 100 KB | 34.899 | 32.702 | 0.418 | 34.905 | 32.702 | 0.418 | 34.882 | 32.7 | 0.418 |
| | 200 KB | 34.899 | 32.702 | 0.418 | 34.905 | 32.702 | 0.418 | 34.882 | 32.7 | 0.418 |
| Image 3 | 1 KB | 18.912 | 35.363 | 0.684 | 18.049 | 35.566 | 0.699 | 14.198 | 36.6 | 0.763 |
| | 10 KB | 34.91 | 32.701 | 0.418 | 34.89 | 32.703 | 0.418 | 34.892 | 32.703 | 0.418 |
| | 100 KB | 34.935 | 32.698 | 0.417 | 34.885 | 32.704 | 0.418 | 34.832 | 32.71 | 0.419 |
| | 200 KB | 34.935 | 32.698 | 0.417 | 34.885 | 32.704 | 0.418 | 34.832 | 32.71 | 0.419 |
| Image 4 | 1 KB | 0.0484 | 61.2808 | 0.9991 | 0.0419 | 61.907 | 0.999 | 0.033 | 62.94 | 0.999 |
| | 10 KB | 0.8214 | 48.9848 | 0.9863 | 0.807 | 49.058 | 0.986 | 0.728 | 49.5 | 0.987 |
| | 100 KB | 13.8238 | 36.7245 | 0.7696 | 7.187 | 39.565 | 0.88 | 7.416 | 39.42 | 0.876 |
| | 200 KB | 13.8238 | 36.7245 | 0.7696 | 7.187 | 39.565 | 0.88 | 7.416 | 39.42 | 0.876 |
| Image 5 | 1 KB | 35.313 | 32.651 | 0.411 | 27.259 | 33.775 | 0.546 | 27.68 | 33.7 | 0.538 |
| | 10 KB | 34.758 | 32.72 | 0.421 | 34.824 | 32.711 | 0.419 | 34.81 | 32.71 | 0.41 |
| | 100 KB | 34.779 | 32.717 | 0.42 | 34.748 | 32.721 | 0.421 | 34.87 | 32.77 | 0.41 |
| | 200 KB | 34.779 | 32.717 | 0.42 | 34.748 | 32.721 | 0.421 | 34.87 | 32.77 | 0.41 |
| Image 6 | 1 KB | 8.145 | 39.022 | 0.864 | 4.321 | 41.774 | 0.927 | 3.91 | 42.2 | 0.93 |
| | 10 KB | 35.307 | 32.652 | 0.411 | 35.118 | 32.675 | 0.415 | 34.89 | 32.7 | 0.41 |
| | 100 KB | 34.902 | 32.702 | 0.418 | 35.589 | 32.617 | 0.407 | 35.33 | 2.61 | 0.41 |
| | 200 KB | 34.902 | 32.702 | 0.418 | 35.589 | 32.617 | 0.407 | 35.33 | 2.61 | 0.41 |
| Image 7 | 5 KB | 11.825 | 37.402 | 0.803 | 13.626 | 36.786 | 0.772 | 26.5 | 33.89 | 0.55 |
| | 10 KB | 34.75 | 32.721 | 0.421 | 34.943 | 32.697 | 0.417 | 34.74 | 32.72 | 0.42 |
| | 100 KB | 34.908 | 32.701 | 0.418 | 34.914 | 32.7 | 0.418 | 34.75 | 32.72 | 0.42 |
| | 200 KB | 34.908 | 32.701 | 0.418 | 34.914 | 32.7 | 0.418 | 34.75 | 32.72 | 0.42 |
| Image 8 | 1 KB | 2.798 | 43.663 | 0.953 | 0.766 | 49.286 | 0.987 | 0.97 | 48.24 | 0.98 |
| | 10 KB | 34.802 | 32.714 | 0.419 | 33.802 | 32.841 | 0.4366 | 34.77 | 32.71 | 0.42 |
| | 100 KB | 34.842 | 32.709 | 0.419 | 34.735 | 32.723 | 0.421 | 34.72 | 32.72 | 0.42 |
| | 200 KB | 34.842 | 32.709 | 0.419 | 34.735 | 32.723 | 0.421 | 34.72 | 32.72 | 0.42 |
| Image 9 | 1 KB | 13.068 | 36.969 | 0.782 | 5.723 | 40.554 | 0.905 | 6.37 | 40.08 | 0.89 |
| | 10 KB | 34.911 | 32.701 | 0.418 | 34.778 | 32.717 | 0.42 | 35.1 | 32.67 | 0.41 |
| | 100 KB | 34.881 | 32.705 | 0.419 | 34.799 | 32.715 | 0.42 | 34.77 | 32.71 | 0.42 |
| | 200 KB | 34.881 | 32.705 | 0.419 | 34.799 | 32.715 | 0.42 | 34.77 | 32.71 | 0.42 |
| Image 10 | 1 KB | 29.278 | 33.465 | 0.512 | 12.48 | 37.168 | 0.792 | 21.08 | 34.89 | 0.64 |
| | 10 KB | 34.924 | 32.699 | 0.418 | 34.887 | 32.704 | 0.418 | 34.78 | 32.71 | 0.42 |
| | 100 KB | 34.722 | 32.724 | 0.422 | 34.813 | 32.713 | 0.42 | 34.78 | 32.71 | 0.42 |
| | 200 KB | 34.722 | 32.724 | 0.422 | 34.813 | 32.713 | 0.42 | 34.78 | 32.71 | 0.42 |
| Image 11 | 1 KB | 0.815 | 49.017 | 0.986 | 0.562 | 50.631 | 0.99 | 0.99 | 48.13 | 0.98 |
| | 10 KB | 13.755 | 36.746 | 0.771 | 13.535 | 36.816 | 0.774 | 13.9 | 36.96 | 0.76 |
| | 100 KB | 34.834 | 32.71 | 0.419 | 34.73 | 32.723 | 0.421 | 308 | 23.23 | −4.14 |
| | 200 KB | 34.834 | 32.71 | 0.419 | 34.73 | 32.723 | 0.421 | 308 | 23.23 | −4.14 |
| Image 12 | 1 KB | 34.731 | 32.724 | 0.421 | 34.769 | 32.718 | 0.42 | 34.8 | 32.71 | 0.41 |
| | 10 KB | 35.165 | 32.669 | 0.413 | 35.585 | 32.618 | 0.407 | 34.98 | 32.69 | 0.41 |
| | 100 KB | 34.907 | 32.701 | 0.418 | 35.528 | 32.625 | 0.408 | 34.73 | 32.72 | 0.42 |
| | 200 KB | 34.907 | 32.701 | 0.418 | 35.528 | 32.625 | 0.408 | 34.73 | 32.72 | 0.42 |
| Image 14 | 1 KB | 0.283 | 53.613 | 0.995 | 1.395 | 46.686 | 0.976 | 0.06 | 59.7 | 0.99 |
| | 10 KB | 17.071 | 35.808 | 0.715 | 20.736 | 34.963 | 0.654 | 4.51 | 41.58 | 0.92 |
| | 100 KB | 34.929 | 32.698 | 0.418 | 34.23 | 32.786 | 0.43 | 15.87 | 36.12 | 0.73 |
| | 200 KB | 34.929 | 32.698 | 0.418 | 34.23 | 32.786 | 0.43 | 15.87 | 36.12 | 0.73 |
| Image 15 | 1 KB | 31.992 | 33.08 | 0.467 | 6.623 | 39.919 | 0.889 | 10.79 | 0.82 | 0.82 |
| | 10 KB | 34.842 | 32.709 | 0.419 | 34.82 | 32.712 | 0.42 | 34.91 | 32.7 | 0.41 |
| | 100 KB | 35.36 | 32.645 | 0.41 | 34.77 | 32.718 | 0.42 | 34.87 | 32.7 | 0.41 |
| | 200 KB | 35.36 | 32.645 | 0.41 | 34.77 | 32.718 | 0.42 | 34.87 | 32.7 | 0.41 |
| Image 16 | 1 KB | 34.898 | 32.702 | 0.418 | 35.257 | 32.658 | 0.412 | 34.87 | 32.7 | 0.4 |
| | 10 KB | 34.899 | 32.702 | 0.418 | 34.942 | 32.697 | 0.418 | 34.91 | 32.7 | 0.4 |
| | 100 KB | 35.373 | 32.644 | 0.41 | 35.239 | 32.66 | 0.413 | 34.89 | 32.7 | 0.4 |
| | 200 KB | 35.373 | 32.644 | 0.41 | 35.239 | 32.66 | 0.413 | 34.89 | 32.7 | 0.4 |
| Average | | 28.087 | 35.349 | 0.531 | 27.329 | 35.681 | 0.551 | 35.223 | 34.0957 | 0.409 |

As it can be gathered from the Table 1, the values of mean square error (MSE) are comparatively lower for the method 1 and method 2 with respect to the conventional optimal pixel adjustment procedure (OPAP), which means that the method 1 and method 2 have comparatively less error rate (approx. 19.5-21.5 percent). The values of peak signal to noise ratio (PSNR) are comparatively higher for the method 1 and method 2 with respect to the conventional optimal pixel adjustment procedure (OPAP), which means that the method 1 and method 2 produces better results for restoration. Further, the value of structural similarity index method (SSIM) are comparatively higher for the method 1 and method 2 with respect to the conventional optimal pixel adjustment procedure (OPAP), which means that the method 1 and method 2 produces steganography images, which are more similar to the cover images than the optimal pixel adjustment procedure (OPAP).

Figure 2A:
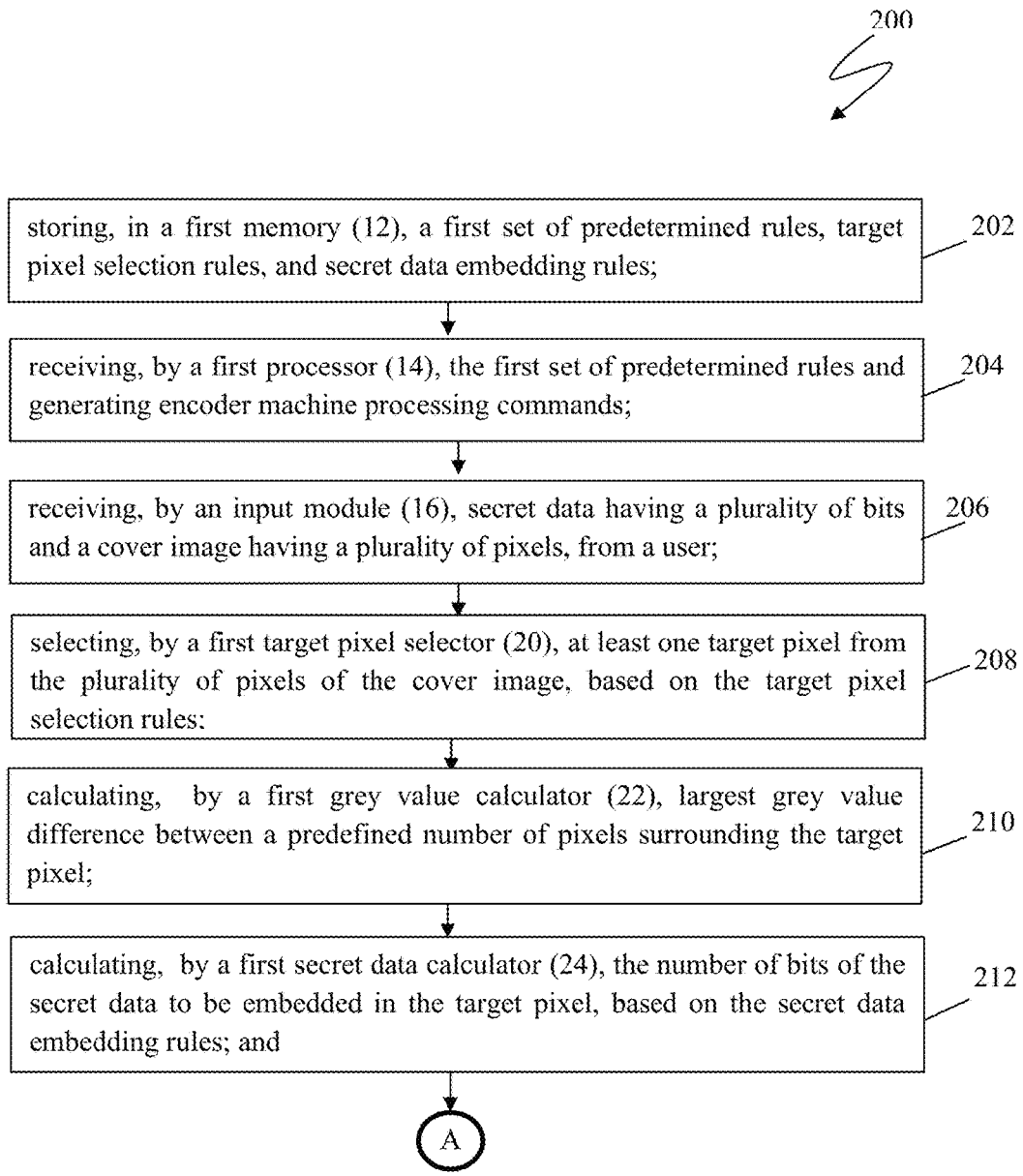
FIGS. 2A and 2B illustrate a flow diagram showing steps performed by the steganography system of FIG. 1, in accordance with an embodiment of the present disclosure.
Figure 2B:
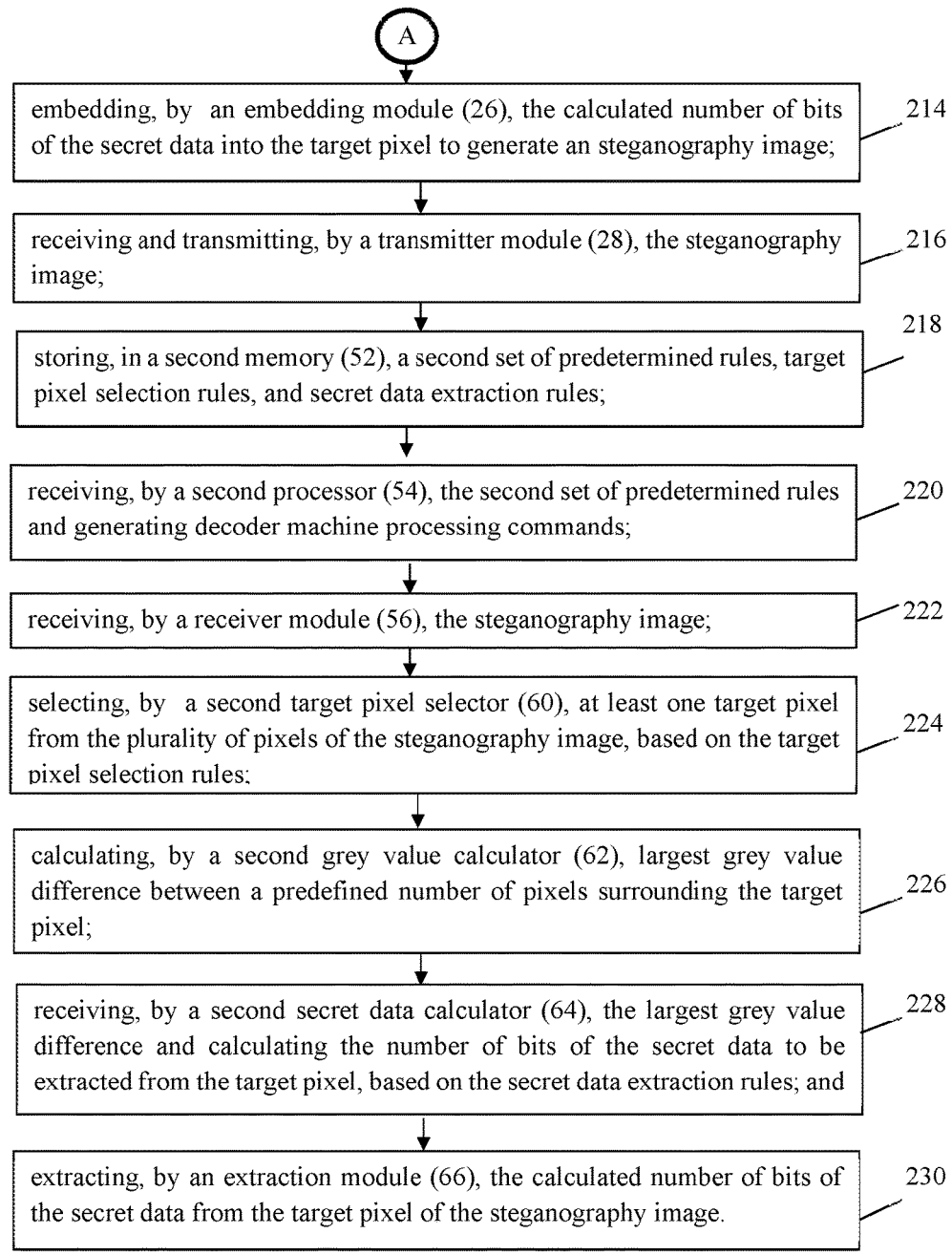
Figure 4A:
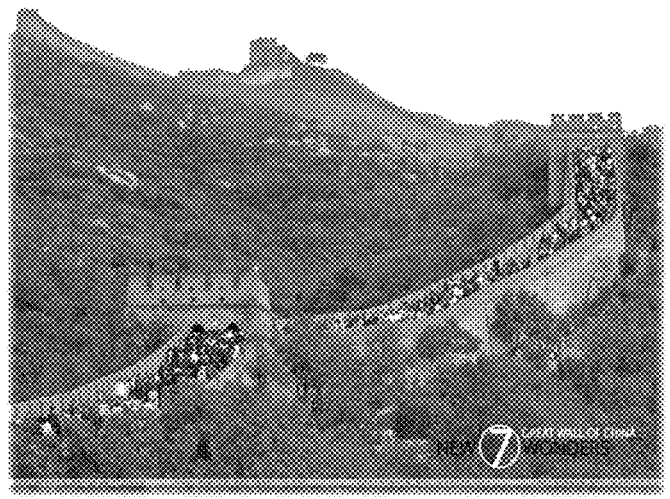
Figure 4B:
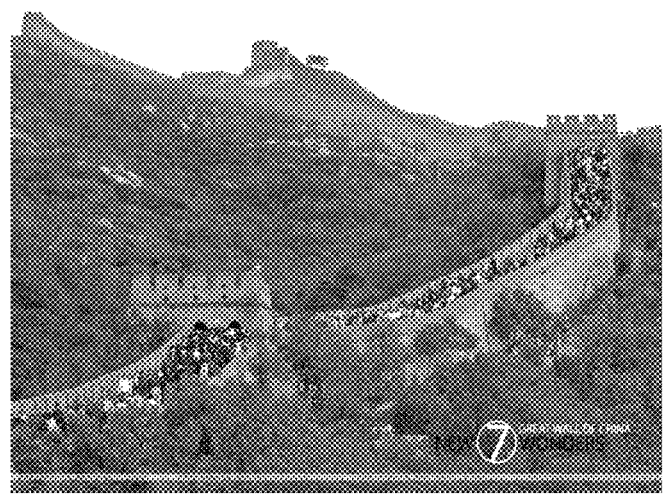
Figure 5A:
Figure 5B:
Figure 6A:
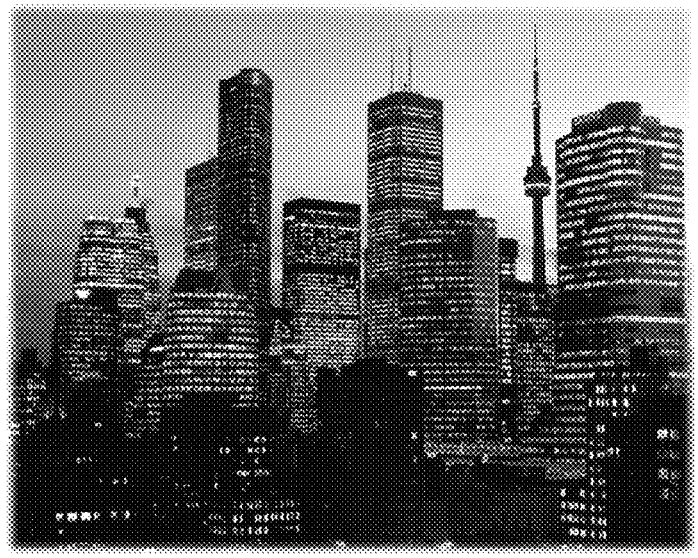
Figure 6B:
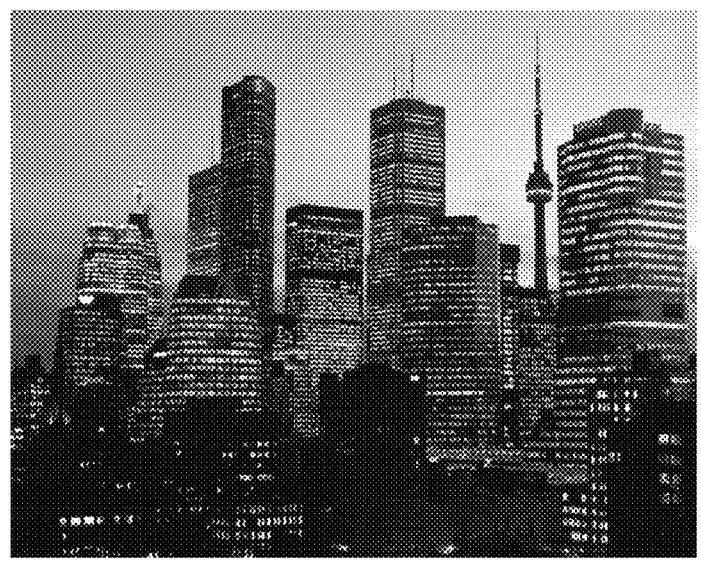
Figure 7A:
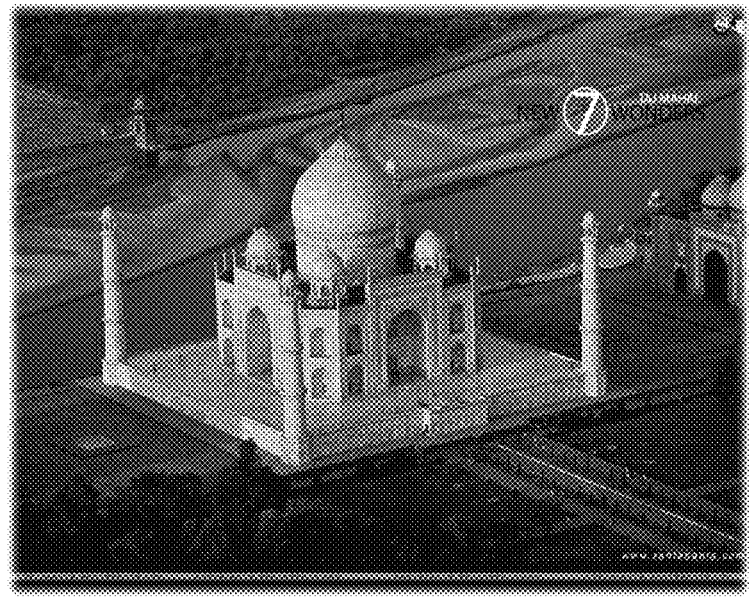
Figure 7B:
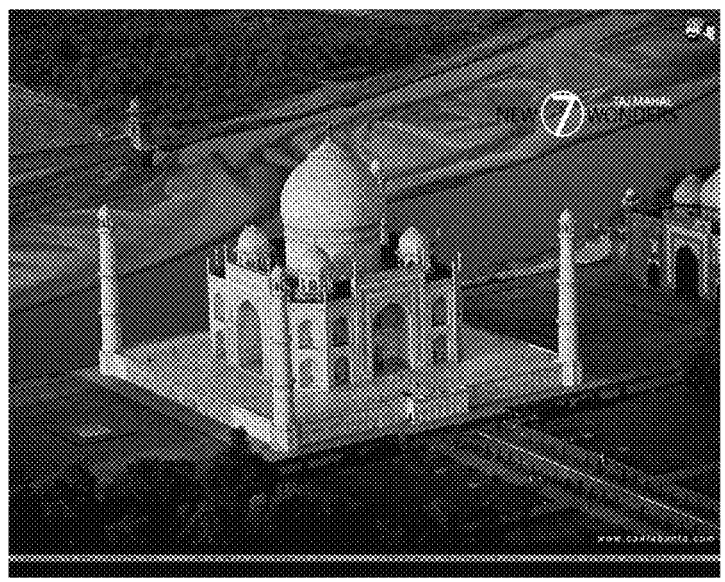

FIGS. 2A and 2B illustrate a flow diagram 200 showing method steps performed by the steganography system 100, in accordance with an embodiment of the present disclosure.

At block 202, storing a first set of predetermined rules, target pixel selection rules, and secret data embedding rules.

In an embodiment, the first memory 12 stores a first set of predetermined rules, target pixel selection rules, and secret data embedding rules.

At block 204, receiving the first set of predetermined rules and generating encoding machine processing commands. In an embodiment, the first processor 14 receives the first set of predetermined rules and generates encoding machine processing commands.

At block 206, receiving secret data having a plurality of bits and a cover image having a plurality of pixels, from a user. In an embodiment, the input module 16 receives secret data having a plurality of bits and a cover image having a plurality of pixels from the user.

At block 208, selecting at least one target pixel from the plurality of pixels of the cover image, based on the target pixel selection rules. In an embodiment, the first target pixel selector 20 selects the target pixel from the plurality of pixels of the cover image, based on the target pixel selection rules.

At block 210, calculating the largest gray value difference between a predefined number of pixels surrounding the target pixel. In an embodiment, the first gray value calculator 22 calculates the largest gray value difference between a predefined number of pixels surrounding the target pixel.

At block 212, calculating the number of bits of the secret data to be embedded in the target pixel, based on the secret data embedding rules. In an embodiment, the first secret data calculator 24 calculates the number of bits of the secret data to be embedded in the target pixel, based on the secret data embedding rules.

At block 214, embedding the calculated number of bits of the secret data into the target pixel and generating a steganography image. In an embodiment, the embedding module 26 embeds the calculated number of bits of the secret data into the target pixel to generate a steganography image.

At block. 216, receiving and transmitting said steganography image. In an embodiment, the transmitter module 28 cooperates with the embedding module 26 to receive the steganography image and further transmits the steganography image.

At block 218, storing a second set of predetermined rules, target pixel selection rules, and secret data extraction rules. In an embodiment, the second memory 52 stores a second, set of predetermined rules, target pixel selection rules, and secret data extraction rules.

At block 220, receiving the second set of predetermined rules and generating decoding machine processing commands. In an embodiment, the second processor 54 receives the second set of predetermined rules and generating decoding machine processing commands.

At block 222, receiving the steganography image. In an embodiment, the receiver module 56 receives the steganography image.

At block 224, selecting at least one target pixel from the plurality of pixels of the steganography image, based on the target pixel selection rules. In an embodiment, the second target pixel selector 60 selects at least one target pixel from the plurality of pixels of the steganography image, based on the target pixel selection rules.

At block 226, calculating the largest gray value difference between a predefined number of pixels surrounding the target pixel. In an embodiment, the second gray value calculator 62 calculates largest gray value difference between a predefined number of pixels surrounding the target pixel.

At block 228, receiving the largest gray value difference and calculating the number of bits of the secret data to be extracted from the target pixel, based on the secret data extraction rules. In an embodiment, the second secret data calculator 64 receives the largest gray value difference and calculates the number of bits of the secret data to be extracted from the target pixel, based on the secret data extraction rules.

At block 230, extracting the calculated number of bits of the secret data from the target pixel of the steganography image. In an embodiment, the extraction module 66 extracts the calculated number of bits of the secret data from the target pixel of the steganography image.

FIGS. 4A, 5A, 6A, and 7A illustrate steganography images containing secret data, generated using OPAP method. FIGS. 4B, 5B, 6B, and 7B illustrate the same steganography images containing secret data, generated using Method 1 and Method 2. As it can be seen, there is haziness at the boundary section of images generated using OPAP method. Whereas, the images generated using the Method 1 and the Method 2 does not have haziness and are of better quality.

Technical Advancements

The technical advancements of the system and method envisaged by the present disclosure include the realization of:
 a computer implemented system for steganography which exchange sensitive data;
 a computer implemented system for steganography which generating better quality steganography image; and
 a computer implemented system for steganography which hides more secret data in the images/videos.

The disclosure has been described with reference to the accompanying embodiments which do not limit the scope and ambit of the disclosure. The description provided is purely by way of example and illustration.

The embodiments herein above and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification, specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A computer implemented system for steganography 100, said system comprising:
   an encoding machine 10 comprising:
      a first memory 12 configured to store a first set of predetermined rules, target pixel selection rules, and secret data embedding rules;
      a first processor 14 adapted to cooperate with the first memory 12 to receive the first set of predetermined rules and further configured to generate encoding machine processing commands;
      an input module 16 configured to receive secret data having a plurality of bits and a cover image having a plurality of pixels, from a user; and
      an encoder module 18 adapted to cooperate with the input module 16 to receive the secret data and the cover image, said encoder module 18 comprises:
         a first target pixel selector 20 configured to select at least one target pixel from the plurality of pixels of the cover image, based on the target pixel selection rules;
         a first gray value calculator 22 configured to calculate largest gray value difference between a predefined number of pixels surrounding the target pixel;
         a first secret data calculator 24 adapted to receive the largest gray value difference and configured to calculate the number of bits of the secret data to be embedded in the target pixel, based on the secret data embedding rules; and
         an embedding module 26 configured to embed the calculated number of bits of the secret data into the target pixel to generate a steganography image;
      a transmitter module 28 adapted to cooperate with the embedding module 26 to receive said steganography image and configured to transmit said steganography image; and
   a decoding machine 50 adapted to cooperate with the encoding machine 10, said decoding machine 50 comprising:
      a second memory 52 configured to store a second set of predetermined rules, target pixel selection rules, and secret data extraction rules;
      a second processor 54 adapted to cooperate with the second memory 52 to receive the second set of predetermined rules and further configured to generate decoding machine processing commands;
      a receiver module 56 configured to receive the steganography image;
      a decoder module 58 comprises:
         a second target pixel selector 60 configured to select at least one target pixel from the plurality of pixels of the steganography image, based on the target pixel selection rules;
         a second gray value calculator 62 configured to calculate largest gray value difference between a predefined numbers of pixels surrounding the target pixel;
         a second secret data calculator 64 adapted to receive the largest gray value difference and configured to calculate the number of bits of the secret data to be extracted from the target pixel, based on the secret data extraction rules; and
         an extraction module 66 configured to extract the calculated number of bits of the secret data from the target pixel of the steganography image.

2. The system 100 as claimed in claim 1, wherein the predefined number of pixels surrounding the target pixel is two.

3. The system 100 as claimed in claim 1, wherein the predefined number of pixels surrounding the target pixel is eight.

4. A computer implemented method for steganography 200, said method comprising:
   storing, in a first memory 12, a first set of predetermined rules, target pixel selection rules, and secret data embedding rules;
   receiving, by a first processor 14, the first set of predetermined rules and generating encoding machine processing commands;
   receiving, by an input module 16, secret data having a plurality of bits and a cover image having a plurality of pixels, from a user;
   selecting, by a first target pixel selector 20, at least one target pixel from the plurality of pixels of the cover image, based on the target pixel selection rules;
   calculating, by a first gray value calculator 22, largest gray value difference between a predefined number of pixels surrounding the target pixel;
   calculating, by a first secret data calculator 24, the number of bits of the secret data to be embedded in the target pixel, based on the secret data embedding rules;
   embedding, by an embedding module 26, the calculated number of bits of the secret data into the target pixel and generating a steganography image;
   receiving and transmitting said steganography image;
   storing, in a second memory 52, a second set of predetermined rules, target pixel selection rules, and secret data extraction rules;

receiving, by a second processor 54, the second set of predetermined rules and generating decoding machine processing commands;

receiving, by a receiver module 56, the steganography image;

selecting, by a second target pixel selector 60, at least one target pixel from the plurality of pixels of the steganography image, based on the target pixel selection rules;

calculating, by a second gray value calculator 62, largest gray value difference between a predefined number of pixels surrounding the target pixel;

receiving, by a second secret data calculator 64, the largest gray value difference and calculating the number of bits of the secret data to be extracted from the target pixel, based on the secret data extraction rules; and extracting, by an extraction module 66, the calculated number of bits of the secret data from the target pixel of the steganography image.

5. The method 200 as claimed in claim 4, wherein the predefined number of pixels surrounding the target pixel is two.

6. The method 200 as claimed in claim 4, wherein the predefined number of pixels surrounding the target pixel is eight.

\* \* \* \* \*